United States Patent [19]

Knappe

[11] Patent Number: 4,970,610
[45] Date of Patent: Nov. 13, 1990

[54] MAGNETIC DISK DRIVE START PROCEDURE FOR STARTING REACTION TORQUE AMPLIFICATION

[75] Inventor: LaVerne F. Knappe, Rochester, Minn.

[73] Assignee: International Business Machines Corporation, Armonk, N.Y.

[21] Appl. No.: 253,013

[22] Filed: Oct. 4, 1988

[51] Int. Cl.⁵ .............................................. G11B 21/02
[52] U.S. Cl. .................................. 360/75; 360/98.07; 360/73.03
[58] Field of Search ................ 360/103, 102, 75, 105, 360/70, 73.01, 73.03, 98.07, 99.08

[56] References Cited

U.S. PATENT DOCUMENTS 4,542,429  9/1985  Nishida et al. ..................... 360/103
4,833,550  5/1989  Takizawa et al. .............. 360/103 X

FOREIGN PATENT DOCUMENTS 2166279  4/1986  United Kingdom ................ 360/103

OTHER PUBLICATIONS

Disk File Soft Starting (Controlled Initial Acceleration) Research Disclosure, Nov. 1984, No. 247.

Primary Examiner—Robert S. Tupper
Assistant Examiner—Andrew L. Sniezek
Attorney, Agent, or Firm—Robert W. Lahtinen

[57] ABSTRACT

A magnetic disk drive spindle motor start routine is provided that supersedes the spindle motor primary motor control when a stuck condition, wherein one of more transducer heads are adhered to the disk surface, is found to exist at start. The motor is provided current pulses at the resonant frequency of the worst case stuck system with the sequence limited to a number of pulses that will not cause the torque amplification to exceed a value that would damage the head/suspension assemblies. In another embodiment, the stuck system is provided with a motion sensor to sense positive and negative motion during oscillation of the stuck system and provide current to the motor when motion is positive to effect torque amplification.

7 Claims, 3 Drawing Sheets

MAGNETIC DISK DRIVE START PROCEDURE FOR STARTING REACTION TORQUE AMPLIFICATION

FIELD OF THE INVENTION

This invention pertains to magnetic disk files and more particularly to such a file that includes a spindle motor start procedure including starting reaction torque amplification for separating transducer heads that adhere to the disk surface when the disks are not rotated.

BACKGROUND OF THE INVENTION

One of the most critical times in the life of a magnetic disk file is during the power up of that file. It is at that time that the user may encounter a phenomenon known as stiction, the seizing up of the file. Stiction is evident by the increased force beyond the normal static friction force binding the head and disk surfaces together. Its cause is typically from contamination at the head/disk interface or from excess lubricant.

Numerous strategies are used to combat the effects of stiction. For instance, the disk surface can be textured to decrease the interactive forces between the head and disk. Stiction can be reduced by eliminating materials from the file assembly that have a propensity to outgas organic materials. A third strategy would be the employment of a solid phase lubricant which reduces capillary adhesion and viscous effects.

The prior art illustrates various techniques for overcoming the stiction problem. US patent 4,542,429 shows the application of a radial pulling force applied by the actuator to separate the head from the disk. Japanese patent 58-1858 uses the actuator to apply a minute vibration to the head when the disk rotation starts to release the adhesion between head and disk.

The trend in the disk file business, as in every other element of the electronics industry, is toward miniaturization. As a consequence, the disk file motors are becoming smaller and less powerful. This trend is even more pronounced when the new class of in-hub spindle motors for rotating the magnetic disk assembly is considered. The present invention is directed to spindle motor start technique that overcomes stiction by increasing the effects of existing motor torque and highlights a simple method of implementation and the cost benefits of displacement amplification. The added start torque provided by this method allows a reduction in the cost of spindle motor drive electronics and give better performance than the previous designs. The higher start torque performance represents increased reliability from stiction-type disk file failures.

A previous method for achieving the worst case start torque was to use low on-resistance MOSFETS in a chopper drive scheme. The chopper drive during motor start method uses the motor inductance to produce more DC current in the motor.coil than was taken off the power line. To obtain desired chopper efficiency, the spindle driver needed to have very low on-resistance. This was accomplished by paralleling two power MOSFET bridge drivers.

SUMMARY OF THE INVENTION

This invention relates to the start routine for rigid magnetic disk drives. Due to causes such as organics contamination or excess lubricant on the disks, several head/disk interfaces in a file can be "stuck" prior to power-on, and the motor torque may be insufficient to start the file.

The gist of the invention is a motor start procedure which uses the dynamics of the magnetic disk file itself as a mechanical torque amplifier. In this manner a low torque spindle motor can be used in the file with no additional power requirements on start up and yet provide the maximum starting torque allowed before head/suspension damage.

This can be implemented by the use of "displacement amplification by quasi-resonant torque pulses" which consists of applying a sequence of current pulses to the spindle motor, at a frequency close to the resonant frequency of the rotary spring-mass system formed by the stuck assembly of the disks and suspensions.

Displacement amplification provides enough start torque using only one driver to warrant the removal of the additional parallel driver.- The new single driver with displacement amplification still uses the chopper method, it just no longer needs to be as efficient.

Current start routines consist of gradual application of motor torque to the disk pack. The maximum torque available (henceforth referred to as DC torque)is assumed to be sufficient to break the stiction forces.

For the cases where the stiction force per interface is so high that with a large number of interfaces stuck, the resisting torque created by stiction exceeds the DC torque, a displacement amplification routine must be used.

Although the large majority of files never fall in the high stiction force category, it is clear that such a routine is desirable as a backup for the case where a particular file does not fall in this category.

Since the exact number of stuck interfaces is not known, the exact resonant frequency is also an unknown and the frequency at which the system is excited must either be elaborately adapted to optimize each of the various stuck systems identified to the natural frequency of such system or be a compromise between the most probably resonant and the most useful nonresonant values. The simplest means to adapt to the multiple resonant frequencies resulting from different combinations of stuck heads is through the use of a motion detector that enables pulsing the motor when the oscillatory motion is positive. The natural frequency for the N-stuck interfaces case is calculated from known information about stiffness, damping and inertia of the system according to the formula:

$$f = (r/2\Pi)\sqrt{N K / J} \sqrt{1-z^2}$$

(where K is the stiffness of one suspension, J is the moment of inertia of the disk pack, z is the viscous damping factor end r is the stiction radius).

In practical cases, this formula turns out to be insufficient, due to the nonideal behavior of the real system (more than one degree of freedom, nonlinear behavior for some of the suspensions, etc), the frequency obtained is too different from the natural frequency, so it cannot be used to start the file. The correct approach is to measure the frequency directly and calculate the stiffness from the linear formula.

The specification describes the practical implementation of the displacement implementation of the displacement amplification concept along with a discussion of the limitations of the piecewise-linear, brittle stiction model.

DETAILED DESCRIPTION

Figure 1:
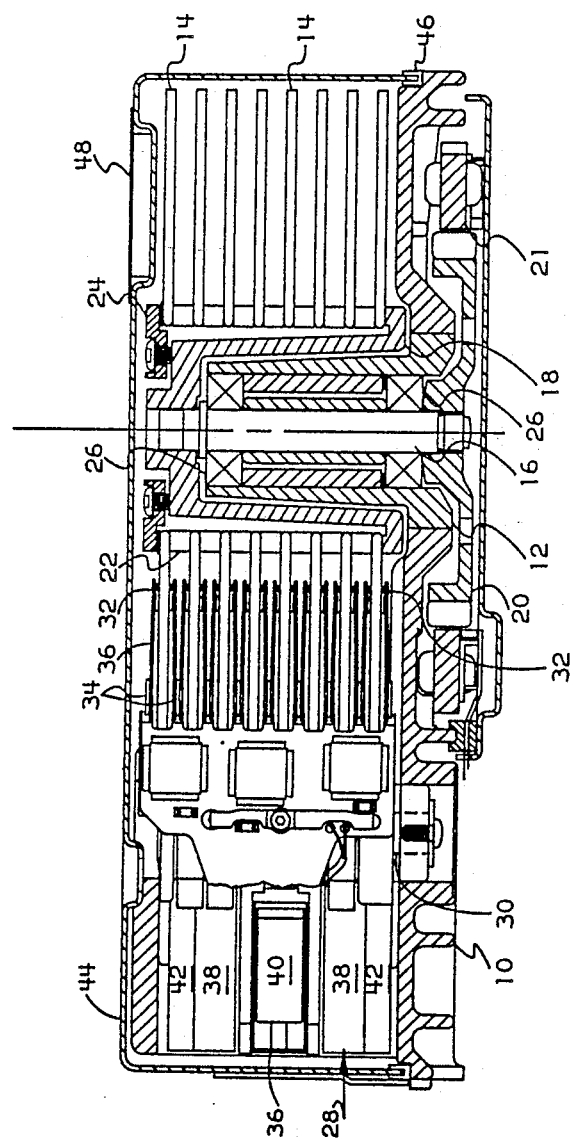
FIG. 1 is a side elevation, partly in section of a typical magnetic disk file which shows the disk assembly, actuator, head-disk enclosure and spindle drive motor.

FIG. 1 shows a typical rigid magnetic disk drive. The drive includes a frame 10 which has a bearing tower 12 as an integral portion. A spindle assembly supports the data disks 14. The spindle assembly includes a spindle shaft 16 which has a hub 18 secured at the upper end and the rotor portion 20 of the spindle motor 21 secured to the opposite end. The data disks 14 are separated by spacers 22 and compressively retained on the hub 18 by a clamp ring 24. The spindle assembly is rotatably supported in the bearing tower 12 by bearings 26. A transistor supporting rotary actuator 28 pivots about the axis of shaft 30 to position transducer heads 32 over desired tracks on the respective data surfaces. Arms 34 carry the flexure suspensions 36 on which the heads 32 are respectively mounted. The actuator is rotated by a voice coil motor assembly that includes coil 36 that pivots in unison with the head/suspension assembly and cooperates with permanent magnets 38 and respective inner and outer core elements 40, 42. A head/disk enclosure is formed about the actuator and disk assembly by the frame 10, the cover 44 and seal 46 therebetween. This enclosure totally surrounds and seals the disk and actuator assemblies except for bearings 26 through which the spindle shaft 16 enters and a breather filter 48. The breather filter is normally placed to access the file interior at the lowest pressure location to assure that all leakage air entering the enclosure is through the filter and all uncontrolled leakage that may occur is out of the enclosure.

Figure 2:
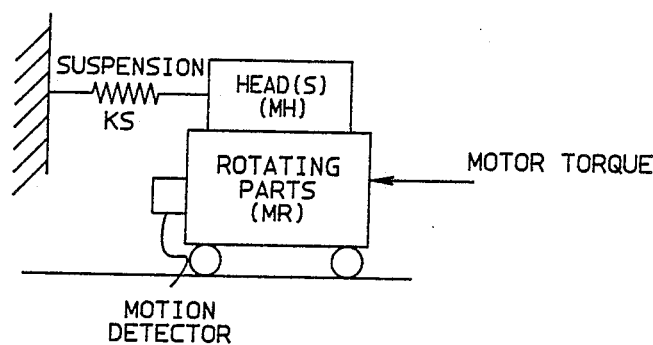
FIG. 2 is a model of a disk file such as that of FIG. 1.

A linear translational representation model of a file for discussion purposed is shown in FIG. 2. In the model the rotating parts are the spindle motor rotor, spindle, disks, etc. which have a mass MR. These elements have a combined mass moment of inertia. When one or more of the heads, which have a mass MH, are stuck to the disk surfaces, the rotating parts are connected to "ground" though the head/suspensions. These suspensions have some elasticity and are represented by a spring (most likely very nonlinear). The file with stuck heads then represents a particular dynamic mechanical system. The stiffness Ks of the "spring" depends upon how many heads are stuck. Its resonant frequencies then are not fixed. The motion detector is added to the system to detect the direction of motion only.

It is known that if motor torque pulses are applied in sync with the rotating motion, the motion amplitude will "build up", in effect increasing the force transmitted through the stuck heads. This effectively amplifies the available torque from the motor.

One design of this motor start procedure used when one or more heads are stuck uses a motion detector. When the velocity of the rotating parts during oscillation of the stuck system is positive (in the intended direction of motor rotation), the motor torque pulse is turned on and when the velocity is negative (in the rotational direction opposite that of intended motor rotation), the motor torque pulse is turned off. This scheme works for any number of stuck heads and is optimum irrespective of the number of stuck heads.

Another approach is the use of a fixed motor torque pulse rate and duration. This pulse rate would be selected to be optimum for some worst case of stuck heads. Then as the number of stuck heads decreased, the amplification would also decrease. Thus, the torque amplification is "tuned" for the worst case of stuck heads and is progressively "detuned" as the number of stuck heads decreases. Since the force on the stuck heads can be increased almost without limit using this procedure, some method of limiting this force must be used. The most simple method is to limit the number of torque pulses.

The amplification method is a direct application of the concept of resonant excitation of a single degree of freedom system. The inertia of the system is provided by the moment of inertia of the disk pack and the stiffness is provided by the equivalent stiffness of N suspensions acting in parallel (if N head/disk interfaces are stuck). The modeled system is nonlinear due to the presence of dry friction (caused by the nonstuck heads and by the spindle bearing), which changes sign at the motion turning points.

In the absence of friction, if the torque is applied to the stuck assembly in the form of a sequence of square pulses at a frequency equal (or close) to the system first natural frequency, the angular displacement response exhibits the well known resonant amplitude linear growth pattern.

Assuming an infinity of pulses, if the exciting frequence is close to, but different from the natural frequency, the response envelope no longer increases indefinitely, but rather reaches a maximum and then decreases; that is, oscillates, takes the shape of a slowly varying sine function. As the discrepancy between the two frequencies becomes larger, the envelope period decreases, until the amplification effect disappears. For frequencies much lower than the natural frequency, the response tends toward a succession of individual responses, while for frequencies much higher than the natural frequencies, the response is almost totally cancelled. A measure of the discrepancy is given by the frequency ratio:

$$\frac{f_{exc}}{f_{nat}} = \sqrt{\frac{N \text{ assumed}}{N \text{ actual}}}$$

which can only assume a discrete set of values.

The presence of viscous damping in the system also has an amplitude limiting effect, by analogy with the similar effect observed with linear systems (mechanical Q-factor, in the case of a harmonic excitation). The familiar concept of frequency response provides good insight into the steady state behavior of the system even in the case when dry friction is present (periodicity of the steady state response implies periodicity of the dry friction input, thus both motor torque and dry friction torque admit a fourier series decomposition, hence each input harmonic component can be analyzed separately).

The general response of a system with damping and dry friction to a periodic sequence of pulses of arbitrary shape and frequency can be obtained with good approximation by either numerical or analytical methods.

Numerical methods using a direct simulation language (DSL) give the most accurate results. Analytical methods can either solve the system piecewise or make a linear system approximation and and solve by fourier decomposition of the excitation and superposition of the individual responses.

For any angular displacement of the disk pack, there is a reaction force at each stuck interface. When the angular displacement of the pack exceeds a certain value, this reaction exceeds the stiction force and the chemical bonds are broken (assuming a brittle bond layer). If all interfaces are stuck with the same force value, the breaking happens simultaneously for all interfaces, and the disks are freed from the heads, so the file can be started.

A necessary condition for the method to be applicable to a given magnetic disk file at a resonant frequency (i.e., for freeing a given number of interfaces) is that the slope of the linear growth envelope produced by the excitation in the absence of dry friction must be larger than the slope of the linear decay envelope caused by the dry friction in the absence of any excitation.

This condition depends on the torque profile DC value, rise/fall times), and the total dry friction torque (bearing torque, friction force per interface and total number of interfaces). For square pulses in the absence of viscous damping, the criterion requires that the DC torque be larger than twice the torque applied by the dry friction forces.

Where the applicability criterion is satisfied for a given device, the problem is then to determine the optimum frequency and number of pulses based on a set of constraints One routine or sequence must cover all possible cases to limit the use of microcode.

The amplification effect should be larger in the all stuck case (the margin is smaller; that is, less DC force is available per stuck interface)

The interface force must remain smaller than the critical compressive load (the flexure "large deformation" force limit should not be exceeded).

The object is to design a routine which will start the file regardless of the number of stuck interfaces for stiction force levels as high as possible, but without exceeding the critical load.

A model which can predict the displacement response (and hence the interface force attained) for all cases, resonant and nonresonant, is instrumental for determining the correct start routine for a given file device (there are Nmax conceivable routine pulse frequencies and for each routine there are Nmax possible values for the actual natural frequency of the system in a given practical situation).

The optimum case is obtained by inspection of the model output, for a sufficiently large number of exciting pulses, for each frequency combination (at most $Nmax^2$ cases). From this comparison it is possible to determine the optimum frequency and number of pulses by choosing the best among those which satisfy all the constraints.

For the disk file illustrated in FIG. 1, this approach results in a displacement amplification routine recommendation (as a backup for cases where the normal ramp-up fails to start the file) of two square pulses (time on=time off) at a frequency of 155 Hz.

Since the numerical model is of great importance in determining the best routine, the system parameters must be carefully measured for model input. Data is extracted from experiments performed with all stuck files (obtained by creating an artificial file environment which induces stiction at all interfaces) and compared to existing data. The final determination depends on how this information is interpreted.

The following is a list of given file parameters and of experimental results for a typical disk drive as illustrated in FIG. 1. Known data is followed by the measured data.

| | |
|---|---|
| Disk pack moment of inertia | 0.00131 kg m$^2$ |
| Flexure (linear) stiffness | 104 gf/mil |
| Stiction radius | 31.4 mm |
| DC current available | 4.1 A |
| Torque/current ratio | 0.019 N m/A |
| Current rise/.fall times | 1 ms, 0.75 ms |
| Head static/kinetic friction | 5 gf, 2 gf |
| Bearing dry friction torque | 0.004 N m |
| Viscous damping ratio | 0 |
| Critical compressive force | 50 gf |

This information is collected prior to stuck file experiments. From the known data it follows that the total DC torque is approximately 11 oz inch (0.078 N m), so that the minimum available force per interface is 15.8 gf.

| | |
|---|---|
| Resonant frequency (all stuck) | 155 Hz |
| Bearing dry friction torque | 0 N m |
| Viscous damping ratio | 0.05–0.06 |

This data was obtained by artificial file stiction and measurement of the system natural frequency (16 heads stuck, free motion response).

The following observations can be made:

1. The bearing dry friction appears to be negligible, whereas there is a significant amount of viscous damping in the file. A special method for extracting the separate contributions of viscous damping ratio and dry friction force from measured amplitude decay curve was used.

The method is analogous to the logarithmic decrement method used to determine viscous damping coefficients in the absence of dry friction. Once the value of viscous the damping ratio is determined, the damping coefficient is easily calculated.

2. From the known data it follows that the frequency for all 16 interfaces stuck should be 111 Hz (using the linear formula) which is in disagreement with the measures value of 155 Hz. A practical consideration helps resolve this discrepancy, since experimental measurements consist of disk displacement curves (detected by a phototonic or capacitive probe) versus time once a particular exponent is postulated in the force-displacement functional relation:

$$F = Q \times^g$$

the displacement x lim corresponding to a force F lim can be obtained from the displacement x DC corresponding to a force F DC, by using:

$$x\ lim = x\ DC\ (f\ lim\ /\ F\ DC)^{1/g}$$

The forces F DC and F lim are known and the step response x DC can be measured so the value of the "stiffness" constant Q becomes irrelevant in determining experimentally the maximum value x lim allowed for the response amplitude. Based on the measured frequency of 155 Hz, an effective stiffness can be calculated. The resulting value is 204 gf/mil.

3. A nonlinear calculation accounting for the flexure geometry and boundary conditions results in a ½ power law for the force deflection curve. The critical buckling load calculated by this method is approximately 400 gf (8 times more than the large deformation limit used as a criterion).

Direct integration for the period gives an amplitude dependent frequency expression (frequency proportional to the $-\frac{1}{4}$ power of the amplitude). However, the relationship between "ration stiffness" (F/x) and frequency is essentially the same as in the linear case (for a frequency of 155 Hz, the value is also approximately 200 gf/mil). The "local stiffness" (dF/dx) is half that value. This shows that in the nonlinear case there can be ambiguity about the notion of "stiffness", thus the method should not be based on direct stiffness measurement (experimental evidence for nonlinearity is also provided by the fact that there is some amplitude dependence in the response frequency).

The true F-x curve is more involved than the linear and nonlinear approximations and the linear approximation is closer to reality in most cases.

Therefore, the model input is linear force-displacement law with an equivalent stiffness calculated from the frequency by using the linear model formula. The input data used is summarized below.

| Moment of inertia | 0.00131 kg m² |
|---|---|
| Flexure stiffness | 204 gf/mil |
| Stiction radius | 31.4 mm |
| DC motor torque (+5%) | 0.082 N m |
| Rise/fall times | 1 ms, 0.75 ms |
| Stat/kin friction | 2 gf, 5 gf |
| Bearing dry friction torque | 0 N m |
| Viscous damping ratio | 0.055 |

In the modeling results, the measured resonant frequency of 155 Hz for this application, corresponding to all 16 interfaces stuck was chosen because it represents the most probable type of stiction and is at the same time the most critical case.

To determine the number of pulses, the model is run with 5 pulses and the displacement output (scaled to force) is compared to the $-50$ gf compressive limit. The comparison indicates that for two pulses, the limit is not attained, but for three pulses, it is attained. Therefore a conservative choice for the number of pulses is two.

The amplification ratio (max force attained/DC force available) for this routine is given below, for various values of N.

| N | Gain (after 2 pulses) |
|---|---|
| 16 | 3.9 |
| 15 | 3.7 |
| 14 | 3.5 |
| 13 | 3.2 |
| 12 | 2.7 |

For N<N max/2, there is no amplification effect (other than that resulting from the step response overshoot), but the DC reaction force per interface is at least twice as large as its value for N=Nmax. Reaction force without torque amplification cannot exceed a gain of 2 for an undamped system without energy loss.

Figure 3:
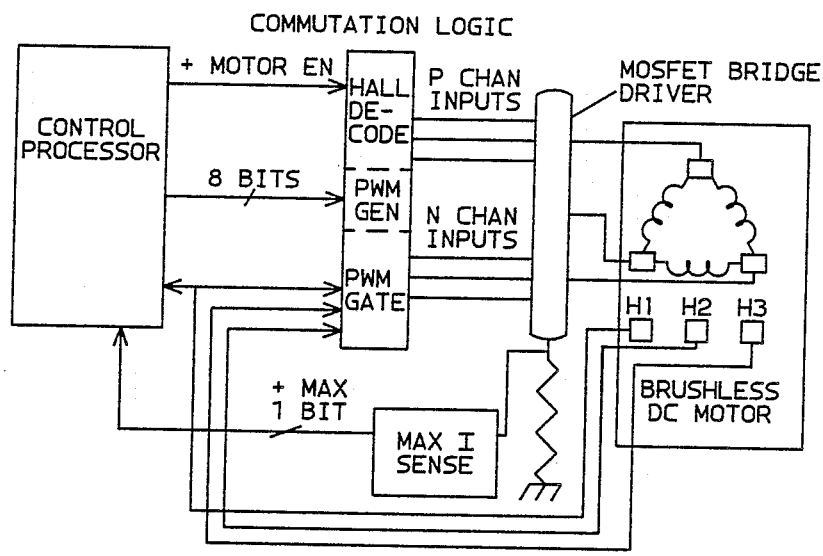
FIG. 3 is a block diagram of the elements of the spindle motor control system.

A block diagram of the spindle motor control system is shown in FIG. 3. The system consists of a microprocessor controller; communication and pulse width modulation logic; a MOSFET, three phase bridge driver; a maximum current sense feedback, and a brushless, direct current, three phase, delta-wound spindle motor including Hall sensors H1, H2, H3.

Speed control is regulated by the microprocessor which monitors the output of a hall sensor in the motor to get position information which it converts to velocity using a timer. A proportional-integral control algorithm converts the velocity error to an 8-bit value proportional to the desired motor current. The microprocessor puts out the 8-bit word to the communication logic. This logic converts the 8-bit word to a 19.8 kilohertz pulse width modulated signal which logically gates the inputs to the N-channel MOSFETs. The pulse width modified N-channel MOSFETs regulate the motor current as a function of their on-time duty cycle. Three hall cells are decoded in the commutation logic to provide the proper sequence to the MOSFET driver for spindle motor rotation.

With the original spindle start algorithm, the processor attempts to start the spindle motor with a series of increasing duty cycle values of the pulse width modulated signal (which is proportional to the spindle motor current). Each value is held for 300 ms and then the output is stepped up to the next higher value in the series. When the current in the sense resistor exceeds the maximum current trip value, a bit toggles to tell the microprocessor to back down one step in the series and hold for one second. A hall cell is monitored to check for spindle movement. If no movement is detected after the one second hold at maximum current, the processor turns off the pulse width modulated signal and the motor enable and posts an error.

If movement is detected, the maximum current value is held until the spindle motor back EMF (electromotive force) is high enough to allow the spindle driver to apply full pulse width duty cycle without exceeding the device specification for start current.

Adding displacement amplification to the device required a change in the microcode for the spindle control processor. The microcode was changed to add displacement amplification as a secondary error recovery routine for the spindle start profile.

The principal reason for implementing this routine as a secondary error recovery start is that for displacement amplification to be most effective, the spindle motor current should be pulsed at the maximum allowable current. The easiest implementation for the current sense hardware in place, is to first step up to the maximum current using the original start algorithm and save the 8-bit value which corresponds to the maximum current. If the original method fails to start the spindle then a recovery routine could use the maximum current 8-bit value to pulse the spindle motor at the system resonance, implementing displacement amplification.

The are other reasons for using the displacement algorithm as a secondary method. Displacement amplification is implemented in this file as insurance against extreme cases of stiction. One reason is to allow for a diagnostic error to be reported that will flag when the file requires the displacement amplification start method. This can be used to screen files in early life or during the manufacturing process. Another reason is to reduce the exposure that this algorithm could have detrimental effects on the head to disk interface. Testing has not shown this to be the case, but as a secondary start method, the number of times that it will be invoked will be very limited over the life of a file.

Figure 4:
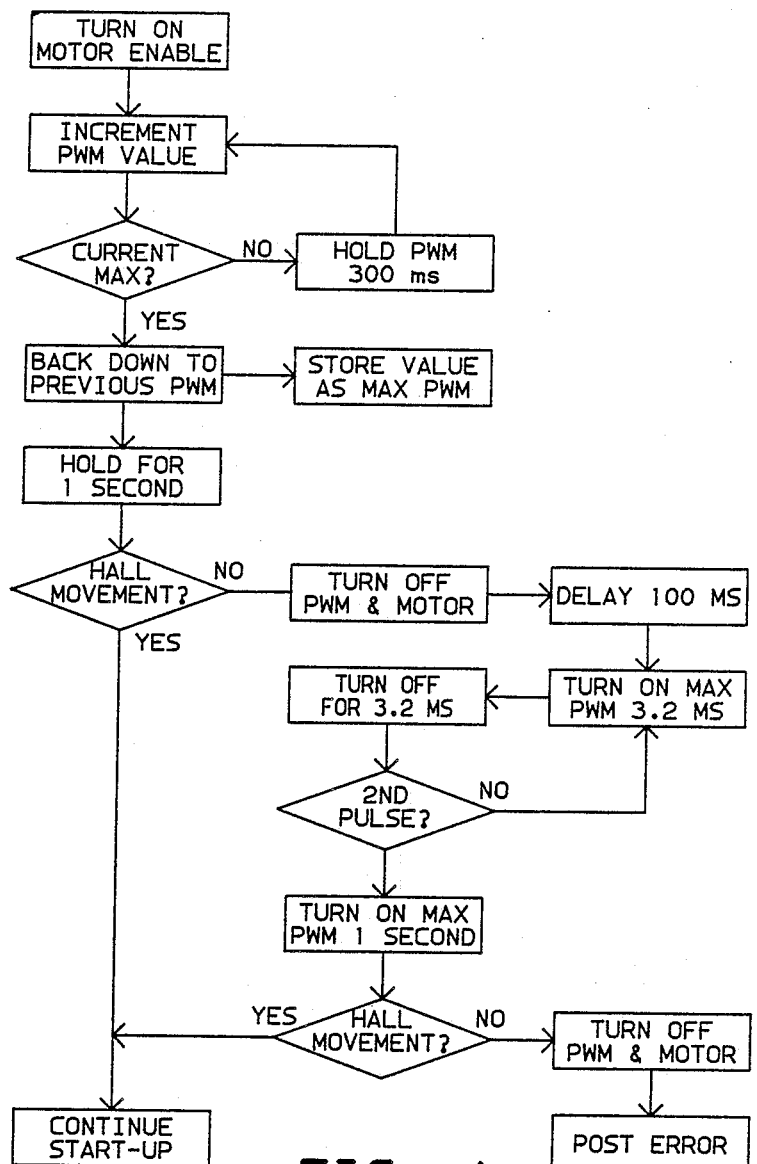
FIG. 4 is a flow chart illustrating the torque amplification technique of the present invention.

FIG. 4 shows a flow chart of the spindle motor start routine with displacement amplification. When the first start routine fails as a result of the failure of the motor to rotate, the processor turns off the spindle motor current for 100 ms. This is to let the mechanical system relax to a state where no torque is applied. This puts the mechanical system in a known state.

The spindle motor is then pulsed twice at the system resonance (155 Hz in this example, 3.2 milliseconds on and 3.2 milliseconds off) with the maximum current and a third pulse (3.2 milliseconds later) is held on for one second at maximum current. If motor rotation is detected, control of the motor start is returned to the first start routine. If no movement is detected, the motor current is turned off and an error is posted.

When the spindle motor system is controlled by a microprocessor, device implementation of displacement amplification can be done with a microcode change for the start profile. Providing two levels of start torque; that is, with and without displacement amplification, can provide additional diagnostics with respect to stiction and also can reduce the number of times this amplification is invoked.

It is fairly obvious from this description that the difficult parts of displacement amplification are identifying the system resonance, assuring that the suspensions, heads and disks are not damaged by the oscillating torque applied to the head disk interface and testing to guarantee that enough start torque is provided by the displacement amplification algorithm. Integrating this method into the device typically will not take additional hardware and can be done with a minor change to the control microcode. In the example described, implementation of displacement amplification results in a cost savings by requiring less hardware and a significant increase in start torque capability. This increase in start torque represents an increase in file reliability from a stiction standpoint.

What is claimed is:

1. In a disk drive the combination of at least one disk mounted as a portion of a rotatable disk assembly, a motor connected to said disk assembly for rotating said disk assembly, an actuator carrying at least one resilient flexure mounted transducer head, each head flying above a respective disk surface when the disk assembly rotates at operating speeds and rests on a respective disk surface when said disk assembly rotation is stopped means for initiation disk rotation, and means for applying a sequence of current pulses to said motor at a frequency approaching the resonant frequency of the disk assembly when a predetermined number of heads are adhered to respective disk surfaces, whereby the torque delivered to rotate said disk assembly is amplified to separate the adhered heads from the respective disk surfaces.

2. The disk drive of claim 1 further comprising means for limiting said sequence of current pulses to a number of pulses less than the number that would cause permanent deformation to an adhered head suspension.

3. A magnetic disk drive having a plurality of rigid disks rotatably mounted within an enclosure as a part of a rotatable spindle assembly that causes said disks to rotate in unison, transducer carriage means within said enclosure mounting a series of suspensions placing transducer heads in confronting relation to respective surfaces of said disks such that when the disks are rotated at an operational speed each head flies above a respective disk surface, being separated therefrom by a film of fluid and when the disks are not rotated, the heads rest upon the respective disk surfaces comprising a motor connected to said spindle assembly to cause rotation of said disks means for initiating rotation of said disks; and means for applying a sequence of current pulses to said motor at a frequency which is substantially the resonant frequency of said spindle assembly when a predetermined number of heads are adhered to respective disk surfaces, whereby an amplified torque is delivered to rotate said disks and separate adhered heads from the respective disk surface.

4. The magnetic disk drive of claim 3 wherein the substantially resonant frequency applied to said motor is the resonant frequency of the rotatable spindle assembly with all heads adhered to the respective disk surfaces, whereby maximum torque is delivered when all heads are stuck and progressively less torque is delivered as fewer heads are stuck and the pulse frequency deviates progressively further from resonance.

5. The magnetic disk drive of claim 4 wherein the number of pulses in said sequence of current pulses is limited to maintain said amplified torque below a threshold that would cause permanent deformation to an adapted head suspension.

6. A magnetic disk drive having a plurality of rigid disks rotatably mounted within an enclosure as part of a rotatable spindle assembly that causes the disks to rotate in unison, transducer carriage means within said enclosure mounting a series of transducer heads in confronting relation to respective surfaces of said disks such that when the disks are rotated at an operational speed each head flies above a respective disk surface, being separated therefrom by a film of fluid and when the disks are not rotated, the heads rest upon the respective disk surfaces comprising a motor connected to said spindle assembly to cause rotation of said spindle assembly means for initiating rotation of said disks; and control means including motion sensing means for sensing positive and negative motion of said spindle when at least one head is adhered to a respective disk surface; and current supply means responsive to said control means to supply current to said motor when said motion is positive and interrupting the supply of current to said motor when said motion is negative, to thereby generate a sequence of current pulses to said motor, whereby an amplified torque is delivered to said spindle assembly to rotate said disks and separate adhered heads from said respective disk surface.

7. The magnetic disk drive of claim 6 wherein the current pulses are limited to maintain torque amplification below a threshold that would cause permanent deformation to an adhered head suspension.

* * * * *